April 5, 1960     H. F. VON THÜNGEN     2,931,240
STEERING ARRANGEMENT FOR MOTOR VEHICLES WITH
APPLICATION OF AN AUXILIARY POWER DEVICE
Original Filed April 5, 1954
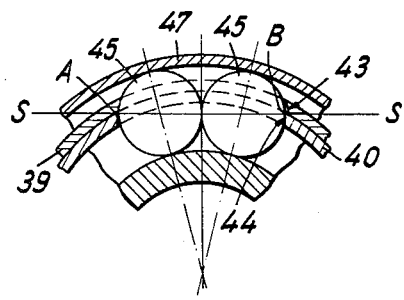
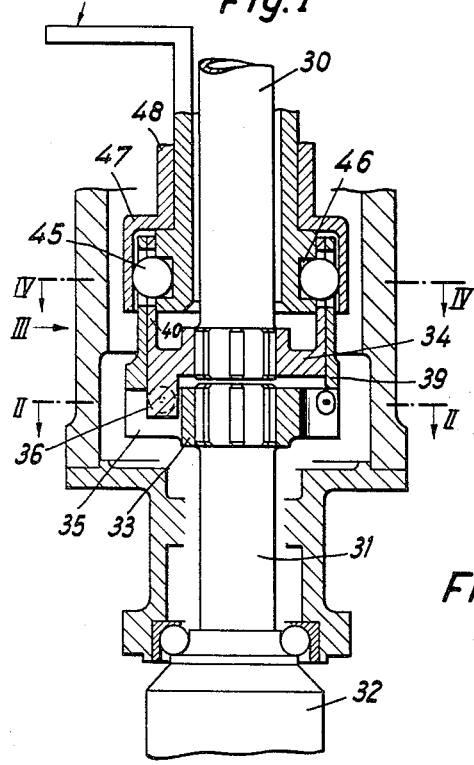
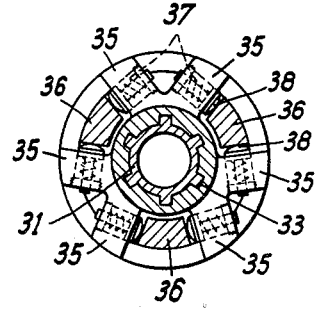
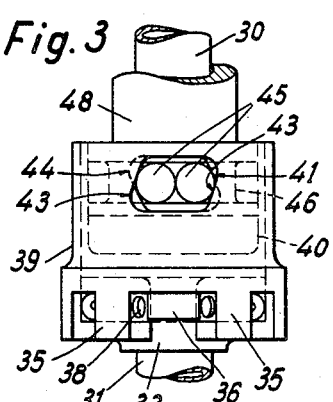
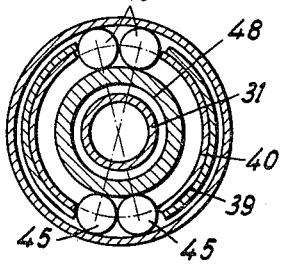
Inventor:
HUBERT F. VON THUNGEN
ATTORNEY United States Patent Office 2,931,240
Patented Apr. 5, 1960

2,931,240

STEERING ARRANGEMENT FOR MOTOR VEHICLES WITH APPLICATION OF AN AUXILIARY POWER DEVICE

Hubert Freiherr von Thüngen, Friedrichshafen am Bodensee, Germany, assignor to Zahnradfabrik Friedrichshafen, Friedrichshafen am Bodensee, Germany Original application April 5, 1954, Serial No. 421,107, now Patent No. 2,855,789, dated October 14, 1958. Divided and this application July 30, 1958, Serial No. 754,910

6 Claims. (Cl. 74—388)

The invention relates to the improvement of the steering of the auxiliary power steering device of motor vehicles, and this application is a division of my application, S.N. 421,107, filed April 5, 1954, and now Patent No. 2,855,789.

In some steering arrangements known so far there was used for the steering of the auxiliary power the movement of members which are arranged after the actual steering drive (worm with engagement member). The steering took place either with the aid of the movement of the finger lever shaft or the axial movement of the steering worm. This has the disadvantage that for the steering of the auxiliary power a relatively large steering angle is necessary which is felt as a dead drive. There has become known also an auxiliary steering arrangement in which there is maintained a sufficiently large steering path for the steering of the servo power even in the case of smaller deflections of the steering wheel. For this purpose there is built in between the steering spindle and the steering worm an additional transfer arrangement, namely a gear transmision whereby the reaction pressure which arises in the transmission effects the steering of the servo power. This arrangement is fairly inconvenient constructually.

With the invention there is now provided an advantageous simplification in that the twisting force which arises in the steering wheel column is used directly for the steering of the auxiliary steering power and, namely, in that a rotation elastic part is provided in the steering column. This rotation elastic part can be either a rotation elastic catch coupling or a part of the steering is formed as rotation rod spring. Hereby there is provided at one end of the rotation rod spring a rotation rigid sleeve the other free end of which executes the relative movement. This relative rotation movement is transformed through guide arrangements such as guide levers or through ball pairs which are guided in inclined slots into a straight line movement for actuating a steering slide which is to be displaced lengthwise. The steering movement is preferably directed in the same line as the steering column axis. The steering slide can be arranged either parallel next to the steering column or coaxially around the steering column.

According to the invention it is found that the servo power is used only to the extent that the twisting force on the steering column requires it so that with a small twisting force there is still a steering without servo power and that a reversing force can still have an effect on the steering wheel in a noticeable manner.

The drawing shows the invention in an embodiment in which the steering column consists of two parts which are connected through an elastic catch coupling with each other and where the twisting movement of the one steering column part is transformed by means of transmission parts with ascending guide paths and rolling bodies into a longitudinal movement.

Fig. 1 shows the steering column with elastic coupling and the other parts together in an upright projection view whereby some parts are shown as being longitudinally cut.

Fig. 2 is a cross section along line II—II of Fig. 1.

Fig. 3 is a side view pertaining to Fig. 1 in the direction of the arrow III of Fig. 1.

Fig. 4 is a cross section along line IV—IV of Fig. 1.

Fig. 5 shows an individual portion of Fig. 4 somewhat enlarged.

In the embodiment according to Figs. 1 to 5 the steering column consists of part 30 provided with the steering wheel not shown and part 31 having the gearing worm 32. Both parts are connected through an elastic catch coupling. This coupling consists of hub 33 which wedged upon the lower steering column part 31, and hub 34 which is fastened on the upper steering column part 30. The hubs have several interengaging catches 35 and 36 which are spring biased with respect to each other and namely in both directions of rotation as can be seen from Fig. 2. There are for instance for this purpose built into the catches 35 of the lower steering column part 31 pressure springs 37 which act upon displaceable bolts 38 and hold these bolts in constant touch with the catches 36 of the steering column upper part 30. Hub 33 carries a cylindrical extension sleeve 39 and a similar sleeve 40 is also present in the case of hub 34. Sleeve 40 is located within sleeve 39 and both can be twisted with respect to each other. There are provided in both sleeves slots the lateral limit surfaces 43 or 44 of which run at an angle to the longitudinal direction of the steering column. These slots lie for instance at two points of the sleeve circumference above each other whereby however the limiting surfaces of each slot of the one sleeve run at an opposite angle to the limiting surfaces of the other sleeve as shown in Fig. 3. Within two each of superimposed slots there are two mutually touching balls 45 which remain in contact simultaneously with the slot limiting surfaces, but are guided primarily in a ring groove 46 of the steering slide 48 of the auxiliary power arrangement. Bell 47 arranged on steering slide 48 serves as outer guide for balls 45. The position of balls 45 is chosen in an advantageous manner in such a way that there arises always the correct cooperation of the balls with the inclined limiting surfaces of the slots of the parts which are to be twisted relatively to each other. This is made possible in that the contact points A and B lie between the one ball and sleeve 39 and between the other ball and sleeve 40 in line SS, which runs through the center points of balls 45 as shown in Fig. 5. By mutual displacement of both sleeves 39 and 40 the steering slide 48 is moved upwardly or downwardly.

A valve control arm as shown is carried by sleeve 48, which arm may be coupled to a valve for actuation thereon in any conventional manner.

Having thus described my invention, I am aware that various changes may be made without departing from the spirit thereof and, accordingly, I do not seek to be limited to the precise illustration herein given, except as set forth in the following claims.

I claim:

1. In a power boost steering mechanism, a steering shaft comprising axially alined relatively rotative sections, a cam sleeve secured to each section, said sleeves having contiguous peripheral portions rotative with respect to each other when said shaft sections have relative rotation, each sleeve having a peripherally extended slot therethrough wherein said slots are generally in register with each other, each slot terminating in a cam edge at each end wherein the cam edges of each slot slope with respect to the shaft axis and are parallel to each other and wherein the slope of the cam edges of one slot is reversed with respect to the slope of the cam edges of the other slot, a plurality of rollable cam follower elements carried within said registering slots of said contiguous sleeves, said elements being engageable with each other and with said sloping cam edges, said cam follower elements being spaced from the peripheral edges of said slots and being displaceable in the direction of the shaft axis by engagement with said cam edges upon relative rotation of said sleeves, a portion of said cam follower elements extending radially outside said slots, and control means engageable by said extending portions and displaceable therewith for effecting control of an auxiliary power steering system.

2. In a device as set forth in claim 1, wherein said cam follower elements comprise a ball pair disposed in said slots, including an additional pair of generally registering slots through said sleeves diametrically opposed to said first mentioned slots and having a ball pair therein and having cam edges co-acting with said latter ball pair.

3. In a device as set forth in claim 1, said control means comprising a sleeve coaxial with said shaft, said cam follower elements extending into engagement therewith to effect reciprocation thereof.

4. In a device as set forth in claim 1, said cam follower elements comprising a ball pair, said ball pair having a diameter greater than the combined thickness of said sleeves so as to have portions extending radially inwardly thereof, said control means comprising a control sleeve coaxial with said shaft and having a groove, said ball pair portions extending into said groove.

5. In a device as set forth in claim 1, and a retaining sleeve disposed exteriorly of said cam sleeves, said control means comprising a control sleeve disposed interiorly of said cam sleeves, all of said sleeves being coaxial with said shaft, and said control and retaining sleeves having engaging shoulders for support of said retaining sleeve on said control sleeve.

6. In a device as set forth in claim 1, said cam sleeves having interdigitating fingers circumferentially spaced from each other and yieldable resilient means intermediate interdigitated fingers whereby relative rotation between said cam sleeves is resisted by said resilient means.

References Cited in the file of this patent

UNITED STATES PATENTS

| | | |
|---|---|---|
| 2,311,010 | Vickers | Feb. 16, 1943 |
| 2,362,930 | Robbins | Nov. 14, 1944 |
| 2,688,258 | Haynes et al. | Sept. 7, 1952 |
| 2,775,133 | Armantrout | Dec. 25, 1956 |
| 2,833,154 | Barnes et al. | May 6, 1958 |